UNITED STATES PATENT OFFICE.

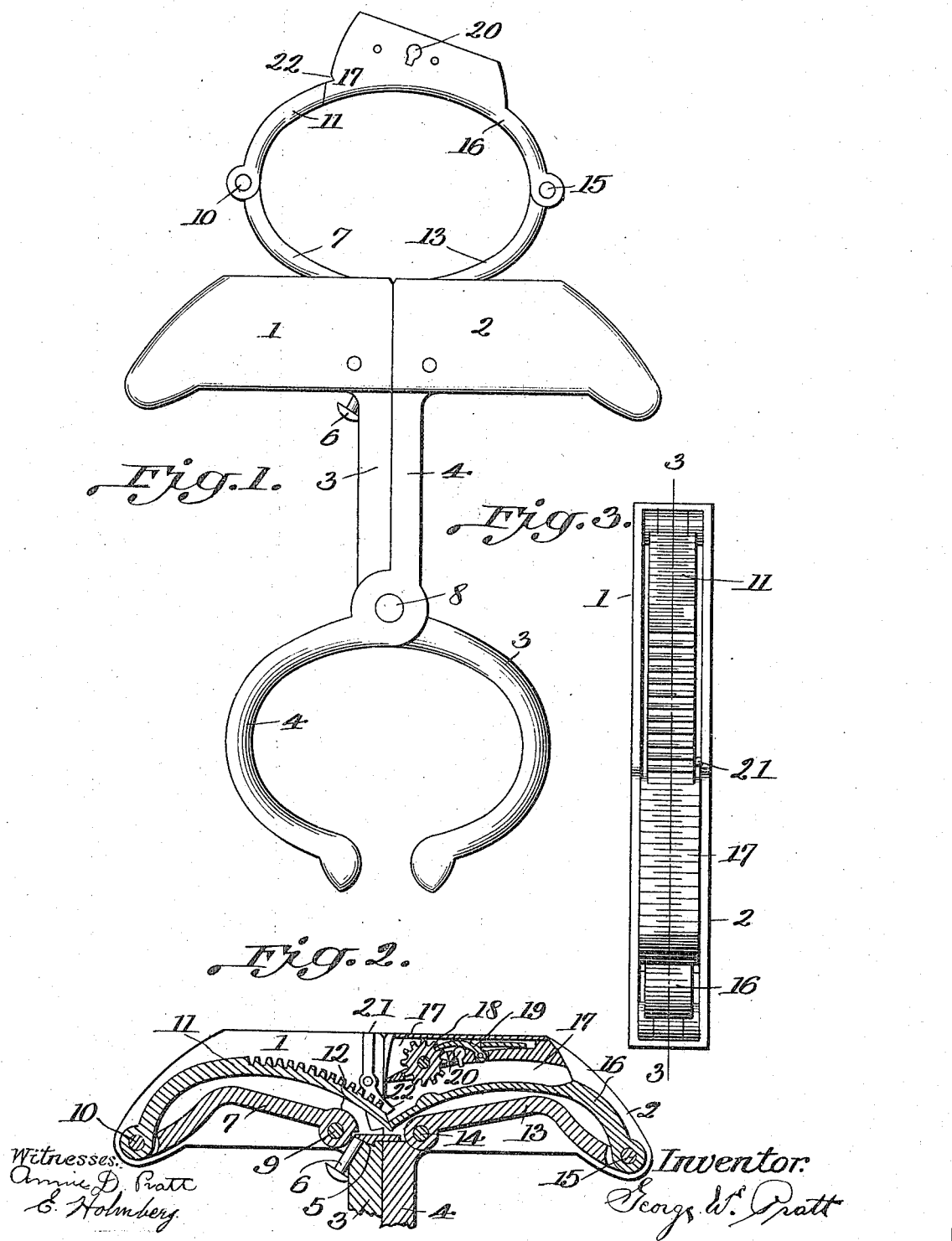
G. W. PRATT.
HANDCUFFS.
APPLICATION FILED DEC. 21, 1914.
1,216,491. Patented Feb. 20, 1917.

GEORGE W. PRATT, OF OAKLAND, CALIFORNIA.

HANDCUFFS.

1,216,491.

Specification of Letters Patent.

Patented Feb. 20, 1917.

Application filed December 21, 1914. Serial No. 878,421.

*To all whom it may concern:*

Be it known that I, GEORGE W. PRATT, a citizen of the United States, residing at 1719 Linden street, city of Oakland, in the county of Alameda and State of California, have invented new and useful Improvements in Handcuffs, of which the following is a specification.

This invention relates to hand-cuffs, and has for its object to supply a pair of handcuffs, one of which can be folded into the handle, which, with the other hand-cuff and the attached handle can be used as a "nipper," also, in case of necessity, as a weapon of defense, thus affording a serviceable instrument in the hands of an officer of the law to aid in the submission of any contumacious prisoner.

The ordinary hand-cuffs consist of two wrist-bands connected by a chain, each cuff provided with a lock. With such an arrangement the officer requires both hands to apply each cuff, and, having applied one of the cuffs, a strong, vigorous prisoner can, by a quick jerk, pull the unattached cuff away from the officer and use it as a sort of sling and, perhaps, injure the officer making the arrest.

In my invention one cuff is connected to a transverse handle by a bar, making, in effect, a serviceable "nipper" when such is required, or when desired to hand-cuff the two hands of a prisoner, the other, auxiliary cuff is exposed and locked upon the unattached hand, this supplying an effective pair of handcuffs.

Figure 1 of the drawings is a side elevation showing the auxiliary cuff exposed.

Fig. 2 is a vertical section taken on the plane of the line 3, 3, of Fig. 3.

Fig. 3 is a top view of the same.

The complete hand-cuffs are made in two halves, the handle 1, 2, of each half connected with down-standing bars 3, 4, crossed and pivoted at 8 to each other by a scissors joint below which the bars 3, 4, are shaped to form the half of the cuff when closed. When opened, the handle 1, 2 and cuff 3, 4, separate the latter to admit the wrist. On bringing the handle halves together a spring hook 5 projecting from the handle half 2 enters the other handle half 1, hooks on to a projection for that purpose, securely holds the cuff below together until released by pressing upward on the pin 6, the top end of which contacts with the under side of the spring hook 5, thereby lifting the hook from engagement with the projection above mentioned.

Each handle-half 1, 2, carries folded within its cavity two pivoted levers, the handle 1 carrying the lever 7, 11, the former pivoted at 9 to the handle-half 1, the free end of the lever 7, pivoted at 10 to the lever 11, the top convex surface of which, for a suitable distance back from the end is in the form of a toothed rack. The end of the lever 7 pivoted at 9 to the handle-half 1, is enlarged to form a cam 12 which, when the lever 7 is perpendicular to the handle half 1, presses on the top of the spring hook 5, thereby holding the spring hook 5 in engagement with the projection it hooks over so long as the lever 7 is in an approximately vertical position with reference to the handle-half 1, thus holding and locking the latter together with the handle-half 2 so long as the auxiliary cuff is in use, this arrangement dispensing with the necessity of a separate lock for each cuff.

The handle-half 2 is also provided with two levers, one of which, 13, is pivoted at 14 to the handle-half 2, and at 15, to the lever 16, the convex part of which is made thinner and carries a housing 17 within which is a pinion 18, the teeth of which are of a pitch to fit the teeth of the lever 11. The pinion 18 teeth serve a double purpose, viz.: engagement with the teeth of the lever 11 and as ratchet teeth for the free end of the pawl 19, Fig. 2, the other end of said pawl 19 being pivoted to the housing 17 and caused to press on and into the pinion 18 teeth, thus permitting the latter pinion 18 to revolve in one direction but not in the other until a key is inserted in the key-hole 20 and turned so the wing of the key will lift the pawl 19, freeing the teeth of the pinion 18, when the lever 11 can be withdrawn from the housing 17 and from the teeth of the pinion 18 and the links 7, 11, folded together in the cavity of the handle-half 1, thus rotating the cam 12 away from pressure on the spring hook 5; then, by pressing upon the pin 6 and so raising the hook of the spring hook 5 clear of the said projection it had hooked on, permitting the handle-halves 1, 2 to be swung apart and the lower cuff to be opened to release the hand-cuffed person.

In order to prevent the links 7, 11, 14, 16, from swinging out of the handle-halves when not so desired, a stop 21 is provided. This stop 21 is pivoted to one of the inside walls of the handle-half 1, the said stop 21 being slightly concaved on the side next to the wall it is pivoted to so as to cause it to remain in any position it may be placed in while the lower end is adapted to engage the notch 22 in the edge of the housing of the lever 16, it will keep the latter in place until the stop 21 is actuated so as to swing the lower end thereof out of the notch 22.

Claim:

In policemen's nippers the combination with a divided stock, the halves of which are pivoted together and provided with a divided hollow handle and transverse pivots; of end-links and connections for forming a supplementary cuff adapted to be folded into the hollow handle, a pinion and a pawl, one of the end-links provided with teeth capable of engagement with teeth of said pinion, the teeth of which also engage with said pawl which permits the pinion to rotate in one direction only; said pinion and pawl being inclosed in a housing on another end-link; of other links connecting the end-links with said transverse pivots within the hollow handle, a latch and a push-pin adapted to raise the hooked end of the latch which holds the divided stock together when the links are folded, substantially as set forth.

GEORGE W. PRATT.

Witnesses:
R. H. ADAMS,
F. A. WISWELL.

Copies of this patent may be obtained for five cents each, by addressing the "Commissioner of Patents, Washington, D. C."